(12) United States Patent
Dirnberger et al.

(10) Patent No.: US 7,395,825 B2
(45) Date of Patent: Jul. 8, 2008

(54) METHOD AND DEVICE FOR ACTIVATING AN ELEMENT MADE OF A SHAPE MEMORY ALLOY

(75) Inventors: Albert Dirnberger, Neunburg Vorm Wald (DE); Rüdiger Eiermann, Syrgenstein (DE); Helmut Jerg, Giengen (DE); Stefan Kautz, Langensendelbach (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 161 days.

(21) Appl. No.: 10/926,922

(22) Filed: Aug. 26, 2004

(65) Prior Publication Data

US 2005/0109071 A1    May 26, 2005

Related U.S. Application Data

(63) Continuation of application No. PCT/EP03/01377, filed on Feb. 12, 2003.

(30) Foreign Application Priority Data

Feb. 26, 2002    (DE) ................... 102 08 213

(51) Int. Cl.
    *B08B 3/02* (2006.01)
(52) U.S. Cl. .................. 134/94.1; 134/186; 251/11
(58) Field of Classification Search .......... 134/186, 134/94.1, 200; 251/11
    See application file for complete search history.

(56) References Cited

U.S. PATENT DOCUMENTS

| | | | | |
|---|---|---|---|---|
| 4,068,820 A | * | 1/1978 | Pimentel | 251/11 |
| 4,284,235 A | * | 8/1981 | Diermayer et al. | 236/1 G |
| 4,608,208 A | * | 8/1986 | Yogo et al. | 261/39.1 |
| 4,884,780 A | | 12/1989 | Ohashi | |
| 4,887,430 A | * | 12/1989 | Kroll et al. | 60/527 |
| 4,973,024 A | * | 11/1990 | Homma | 251/11 |
| 5,033,713 A | * | 7/1991 | Thorsen et al. | 251/11 |
| 5,211,371 A | * | 5/1993 | Coffee | 251/11 |
| 5,400,961 A | * | 3/1995 | Tsutsui et al. | 236/12.12 |
| 6,016,096 A | | 1/2000 | Barnes et al. | |
| 6,124,662 A | * | 9/2000 | Maness | 310/307 |
| 6,318,641 B1 | * | 11/2001 | Knebel et al. | 239/5 |
| 6,374,608 B1 | * | 4/2002 | Corris et al. | 60/528 |
| 6,464,200 B1 | * | 10/2002 | Hines et al. | 251/11 |
| 6,840,257 B2 | * | 1/2005 | Dario et al. | 137/9 |

FOREIGN PATENT DOCUMENTS

| | | |
|---|---|---|
| DE | 42 05 699 A1 | 1/1994 |
| DE | 195 16 436 C1 | 8/1996 |
| DE | 199 33 956 A1 | 2/2000 |
| DE | 199 47 324   * | 4/2001 |
| DE | 199 47 324 A1 | 4/2001 |

(Continued)

*Primary Examiner*—Frankie L Stinson
(74) *Attorney, Agent, or Firm*—Russell W. Warnock; James E. Howard

(57) ABSTRACT

A simple and cost-effective method is provided, according to which a positive temperature component (PTC) element directly controls the element made of a shape memory alloy. A simple and cost effective device for performing the method has a PTC element series-connected upstream from the element made of a shape memory alloy, in the electric circuit for the element made of a shape memory alloy.

1 Claim, 2 Drawing Sheets

FOREIGN PATENT DOCUMENTS

| | | | |
|---|---|---|---|
| DE | 2002-159102 | * | 1/2002 |
| EP | 0 922 892 A1 | | 6/1999 |
| JP | 60-188676 | * | 9/1985 |
| JP | 60196482 | * | 10/1985 |
| JP | 61-241582 | * | 10/1986 |
| JP | 62-117592 | * | 5/1987 |
| JP | 62-278391 | * | 12/1987 |
| JP | 5-130966 | * | 5/1993 |
| JP | 5-261237 | * | 10/1993 |
| JP | 07-27251 | * | 1/1995 |
| JP | 7-27251 | * | 1/1995 |

* cited by examiner

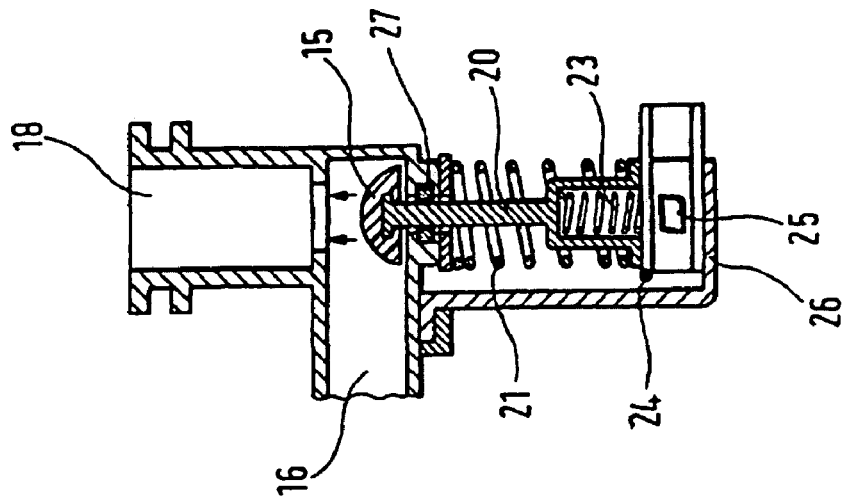
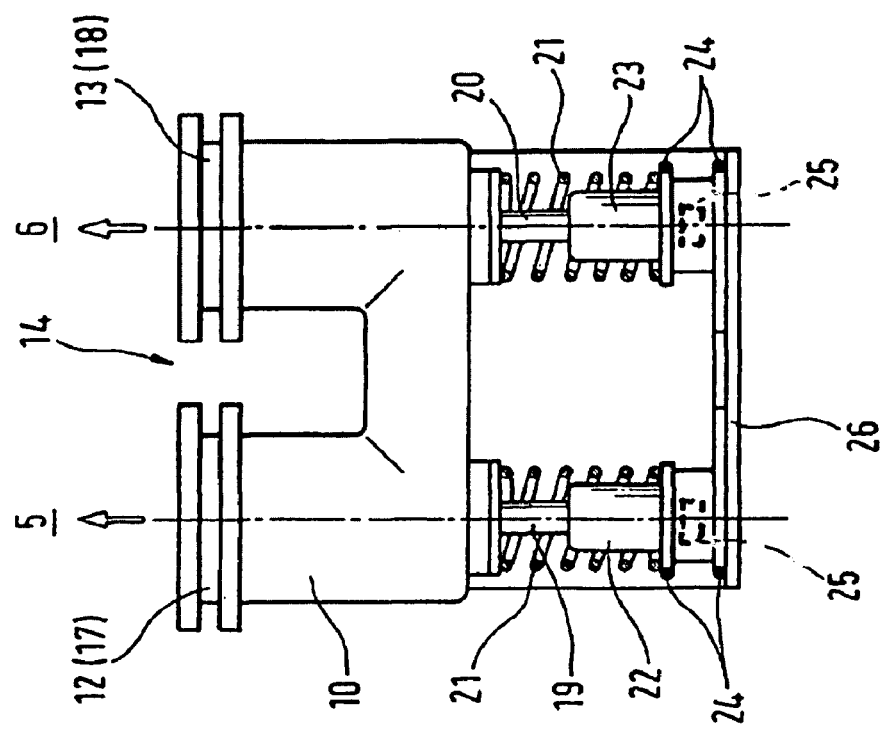

METHOD AND DEVICE FOR ACTIVATING AN ELEMENT MADE OF A SHAPE MEMORY ALLOY

CROSS-REFERENCE TO RELATED APPLICATION

This application is a continuation, under 35 U.S.C. § 120, of copending international application No. PCT/EP03/01377, filed Feb. 12, 2003, which designated the United States; this application also claims the priority, under 35 U.S.C. § 119, of German patent application No. 102 08 213.8, filed Feb. 26, 2002; the prior applications are herewith incorporated by reference in their entirety.

BACKGROUND OF THE INVENTION

Field of the Invention

The invention relates to a method and a device for activating an element made of a shape memory alloy.

Elements made of shape memory alloys (also known as memory metal) have the known property of changing their shape when heated and reverting to the original shape when cooled.

Published, Non-Prosecuted German Patent Application DE 199 47 324 A1 discloses a changeover device of a domestic dishwasher. The valve body of which is brought into a closed position, against the force of a restoring spring, by a heated compression spring made of a shape memory alloy and is brought into an open position by the restoring spring. The compression spring made of the shape memory alloy is heated by a heating element, preferably by a positive temperature component (PTC) element. A separate control circuit is required for this purpose.

However, there are also known applications in which an element made of a shape memory alloy is heated by passing electric current through it. A separate control circuit is required for this purpose.

The previously known configurations are complicated and expensive.

SUMMARY OF THE INVENTION

It is accordingly an object of the invention to provide a method and a device for activating an element made of a shape memory alloy which overcome the above-mentioned disadvantages of the prior art devices and methods of this general type, which provides in a simple manner a simple and low-cost method and a simple and low-cost device for activating an element made of a shape memory alloy.

With the foregoing and other objects in view there is provided, in accordance with the invention, a method for activating an element made of a shape memory alloy. The method includes the step of providing a positive temperature component element for directly activating the element made of the shape memory alloy.

The invention will now be explained in greater detail with reference to an arrangement for executing the method of the present invention illustrated in the figures of the drawings, in which:

FIG. 2 is a front elevational view of a portion of the dishwasher shown in FIG. 1 and showing a changeover device of the dishwasher; and FIG. 3 is a front elevational sectional view of the changeover device shown in FIG. 2.

Figure 1:
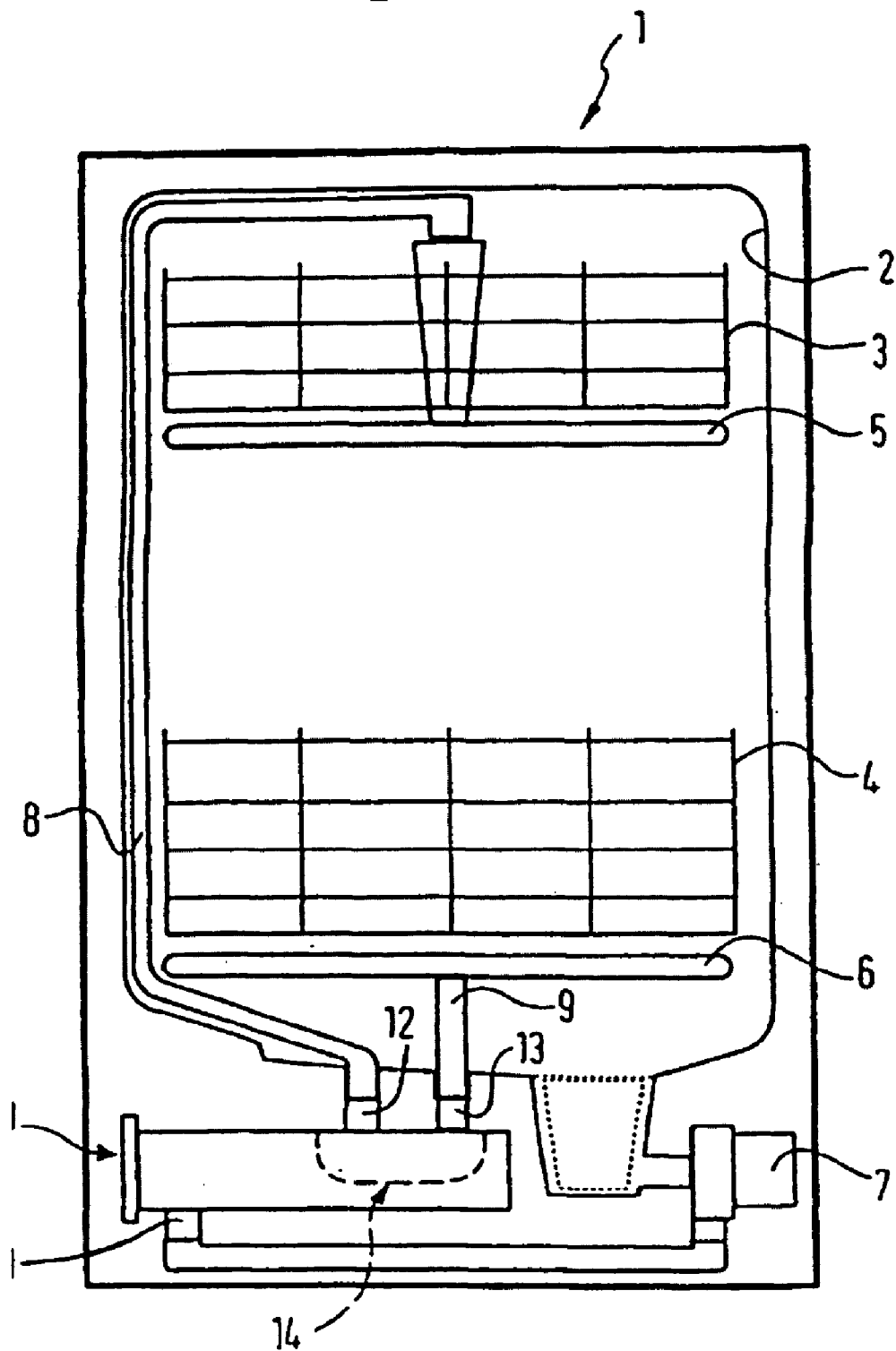
FIG. 1 is a front plan view, in partial section, of a dishwasher configured with one preferred embodiment of the present invention.

With reference to FIG. 1, a dishwasher 1 includes a washing compartment 2 containing one or more racks 3, 4 for holding dishes or other household items to be cleaned. Water is driven through the dishwasher 1 by a pump 7 disposed underneath the washing compartment 2. The dishwasher 1 includes a flow heater 10 that receives water from the pump 7 and delivers the heated water into the washing compartment 2 through water line 12 and riser tube 8 to an upper rack spray arm 5 and delivers the heated water as well into the washing compartment 2 through water line 13 and riser tube 9 to a lower spray arm 6.

With reference to FIGS. 2 and 3, the dishwasher 1 includes a changeover device 14 having a liquid inlet 16 and liquid outlets 17, 18 each connected to the water line 12, 13, respectively. The changeover device 14 includes a valve body 15 within a housing 26 and the valve body 15 can be moved to a closed position for closing the liquid outlet 17, 18. The changeover device 14 includes an individual valve pin 19, 20 with a valve body whose movement into the valve closed position is controlled by a closing spring 22, 23 made of a shape memory alloy that changes its shape when heated. A positive temperature component (PTC) element 25 is disposed in series with the closing spring 22, 23. A spring element 21 returns the closing spring 22, 23 to its original shape after a heating cycle by the positive temperature component element 25. Electrical contacts 24 provide an electrical current to the positive temperature component (PTC) element 25.

With the foregoing and other objects in view there is further provided, in accordance with the invention, a device for activating an element made of a shape memory alloy. The device contains a positive temperature component element disposed in series ahead of the element made of the shape memory alloy in a circuit for the element made of the shape memory alloy.

In accordance with an added feature of the invention, the element made of the shape memory alloy is a closing spring of a valve. Preferably, the valve is used in a machine operating with water, in particular a dishwasher.

In accordance with a further feature of the invention, a spring element is provided and the element made of the shape memory alloy is returned to its original shape by the spring element.

Other features which are considered as characteristic for the invention are set forth in the appended claims.

Although the invention is described herein as embodied in a method and a device for activating an element made of a shape memory alloys, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

PREFERRED EMBODIMENT OF THE INVENTION

On the basis of the method according to the invention for activating an element made of a shape memory alloy, a positive temperature component (PTC) element directly activates the element made of a shape memory alloy.

For carrying out the method according to the invention described above, in the case of the device according to the invention for activating an element made of a shape memory alloy, the PTC element is disposed in series ahead of the element made of a shape memory alloy in the circuit for the element made of the shape memory alloy.

PTC elements have a special characteristic, that is that a high current (about 3 to 6 amperes) flows over a very short time period (about 100 to 500 milliseconds) in the PTC element, with the effect that, in the device according to the invention and on the basis of the method according to the invention, the element of the shape memory alloy is heated very quickly and, as a result, a corresponding great and rapid change in shape is achieved. At the same time, of course, the heat generated by the PTC element that is usually used as a heating element can also contribute to the heating of the element made of a shape memory alloy. Consequently, a heating element that is present in any case in many applications, the PCT element, can be put to an additional use at low cost. Furthermore, it is possible to do without a separate control circuit.

According to the invention, the element made of a shape memory alloy is a closing spring of a valve that is advantageously used in a machine operating with water, preferably in a dishwasher.

As already mentioned at the beginning with respect to a restoring spring relating to Published, Non-Prosecuted German Patent Application DE 199 47 324 A1, it is also the case with the device according to the invention that the element made of a shape memory alloy is expediently returned to its original position by a spring element.

The invention provides in a simple manner a simple and low-cost method and a simple and low-cost device for activating an element made of a shape memory alloy.

We claim:

1. A dishwasher, comprising:
   a receptacle receiving dishes to be washed;
   supply lines injecting water into and from said receptacle; and
   valves connected in said supply lines, said valves containing:
   a closing spring made of a shape memory alloy;
   a positive temperature component element disposed in series with said closing spring; and
   a spring element for returning said closing spring to its original shape after a heating cycle by said positive temperature component element.

* * * * *